Sept. 30, 1941.  M. G. PETERSEN  2,257,618
BRAKE MEANS FOR BAGGAGE TRUCKS
Filed May 21, 1941  2 Sheets-Sheet 1
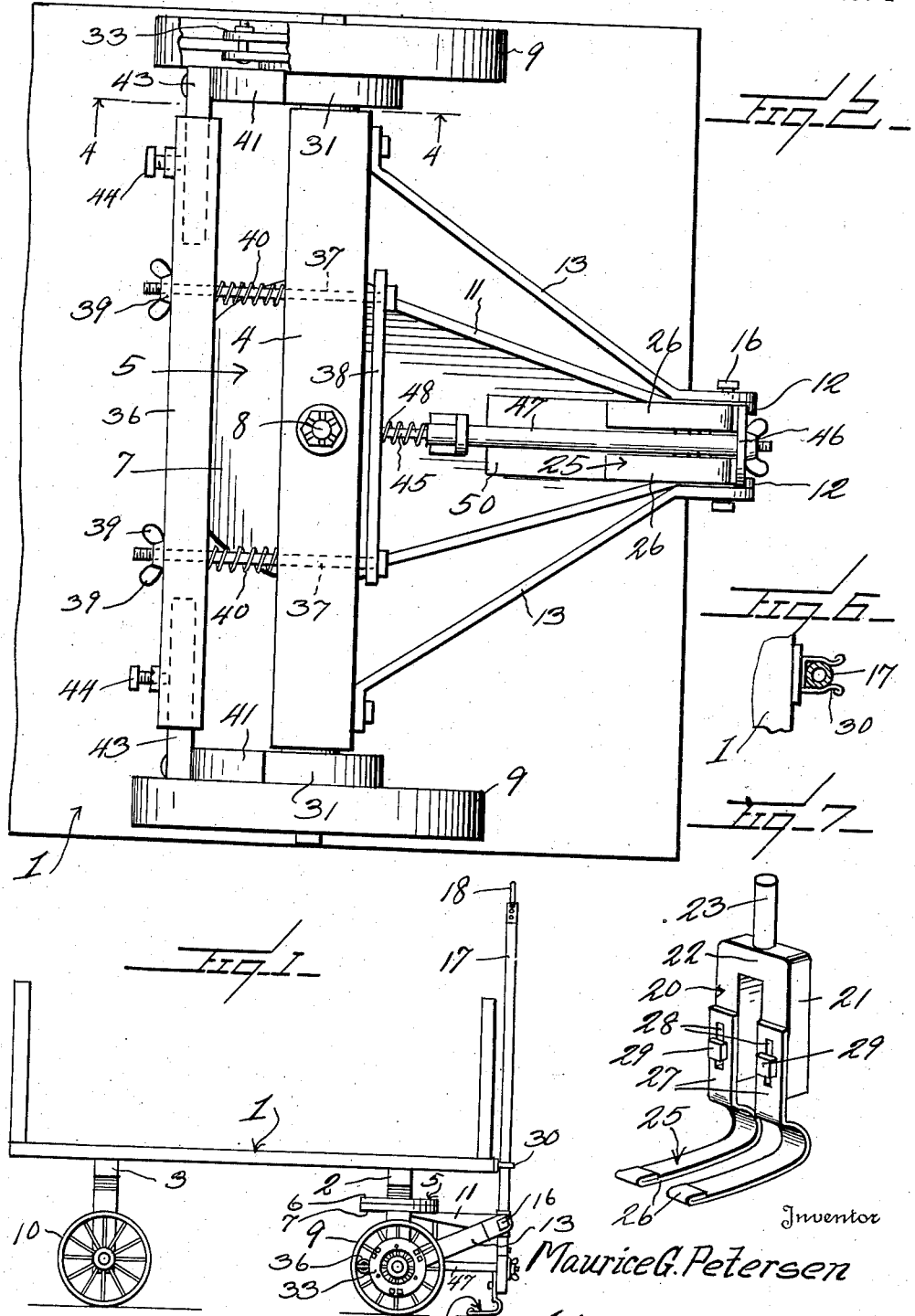

Sept. 30, 1941.　　　　M. G. PETERSEN　　　　2,257,618
BRAKE MEANS FOR BAGGAGE TRUCKS
Filed May 21, 1941　　　　2 Sheets-Sheet 2
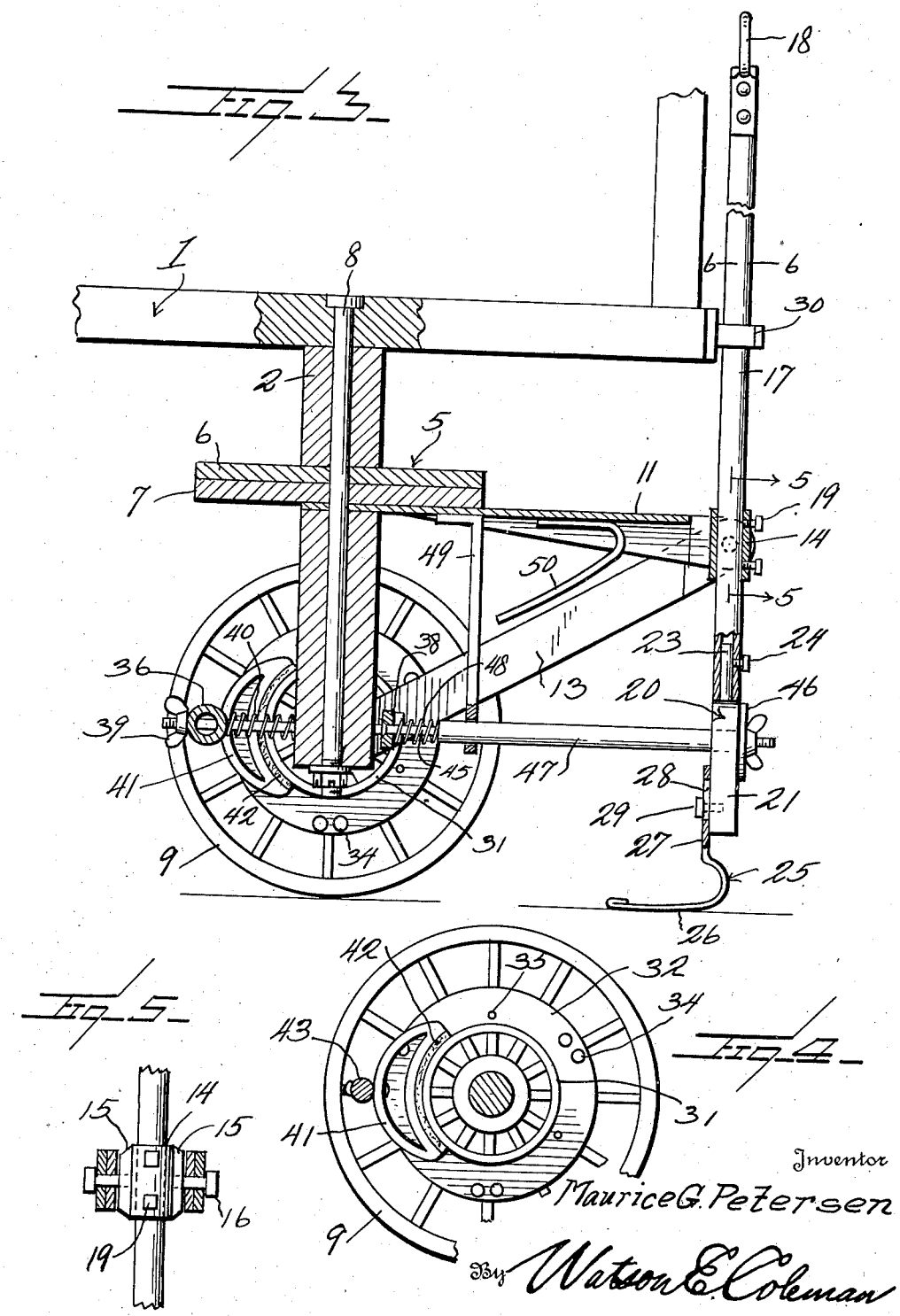
Inventor
Maurice G. Petersen
By Watson E. Coleman
Attorney Patented Sept. 30, 1941

2,257,618

UNITED STATES PATENT OFFICE 2,257,618

BRAKE MEANS FOR BAGGAGE TRUCKS

Maurice G. Petersen, Centralia, Wash.

Application May 21, 1941, Serial No. 394,539

9 Claims. (Cl. 188—119)

This invention relates generally to the class of brakes and pertains particularly to improvements in braking means for use particularly upon small wheeled vehicles, such as baggage trucks and the like.

The principal object of the present invention is to provide a braking means for a mail baggage and express truck which is operatively coupled with the tongue of the truck and which is designed to be put into operation through the manipulation of the truck tongue or handle after the latter has been shifted to a predetermined position with respect to the truck.

Another object of the invention is to provide a truck brake operatively coupled with the control tongue or handle therefor which is automatically adjusting for release when the tongue or handle is released or disengaged by the operator of the truck while it is in a predetermined position whereby the braking action is released, so that the truck may be permitted to move freely.

Another object of the invention is to provide in a mail baggage and express truck, a brake mechanism employing a pair of brake shoes operatively coupled with the truck tongue to be controlled thereby, which includes brake drums adapted to be secured to the inner sides of the front wheels of the truck whereby an ordinary truck not equipped with a brake mechanism may have such braking mechanism installed thereon.

Still another object is to provide in a mail baggage and express truck, a brake mechanism and a shiftable handle or tongue with which the mechanism is connected, which tongue when moved or shifted to a predetermined position, causes the brake mechanism to be put into operation.

A still further object is to provide a mail baggage and express truck having a control tongue which is pivotally supported for movement from an operative position to a vertical inoperative position and which is additionally shiftable longitudinally when in the said vertical position to bring a braking means carried thereby into braking contact with the underlying ground or platform.

The invention will be best understood from a consideration of the following detailed description taken in connection with the accompanying drawings, it being understood, however, that the invention is not to be considered as limited by the specific illustration or description but that such illustration and description constitutes a preferred embodiment of the invention.

In the drawings:

Fig. 1 is a view in side elevation of a truck having a control tongue or handle and equipped with the brake mechanism of the present invention.

Fig. 2 is a bottom plan view of the forward end of the truck, a portion of the structure being broken away and showing the shiftable brake shoes which are operatively connected with the tongue together with the brake drums carried by the wheels.

Fig. 3 is a view partly in side elevation and partly in vertical longitudinal section through the front portion of the truck showing the wheel braking mechanism and the ground engaging braking mechanism which are controlled by manipulation of the truck tongue.

Fig. 4 is a sectional view taken on the line 4—4 of Fig. 2.

Fig. 5 is a sectional view on the line 5—5 of Fig. 3.

Fig. 6 is a sectional view on the line 6—6 of Fig. 3.

Fig. 7 is a view in perspective of the counterbalance secured to the lower end of the truck tongue and carrying the ground engaging friction brake.

Referring now more particularly to the drawings, the numeral 1 generally designates the body of a mail baggage and express truck, such as is commonly used at railway stations or in other places where baggage must be hauled from one point to another. Such trucks have front and rear bolsters 2 and 3, respectively, the front bolster having connected therewith an axle 4 between which and the bolster 2 is the usual fifth wheel indicated generally by the numeral 5, and comprising the upper and lower disks 6 and 7. The king pin 8 passes through the bolster 2 and the underlying axle 4 to maintain these parts together in the customary manner so that the axle may turn for steering. The numeral 9 designates supporting wheels rotatably mounted upon the ends of the axle 4 while the rear bolster has wheels 10 pivotally attached thereto.

Extending forwardly from the under side of the lower plate or disk 7 of the fifth wheel is an arm plate 11 at the forward end of which are formed the spaced ears 12. To each end of the front axle 4 there is connected a brace arm 13 which at its opposite end is disposed against the outer side of an ear 12. Pivotally supported between the ears 12 and the outer ends of the brace arms 13 is a sleeve 14, the opposite sides of which have formed integrally therewith the longitudinally extending ribs 15 which function as spacers between the ears 12 and into each of which is extended a trunnion or pivot 16 which passes through the adjacent ear 12 and the end of the brace 13 lying against the outer side thereof.

The sleeve 14 has slidably extended therethrough the tubular tongue or handle 17 upon the outer end of which is secured the hand grip 18. This tongue may be shifted lengthwise through the sleeve 14 or it may be secured against such movement by set screws 19 which are threaded through the sleeve and bear against the tongue, as shown in Figs. 3 and 5.

As stated, the tongue 17 is tubular and there is connected with the lower end thereof a counterbalance weight which is indicated generally by the numeral 20 and which is in the form of a substantially U-shaped member having the spaced parallel side arms 21 connected by the yoke portion 22. From the transverse center of this yoke portion there extends the post 23 which is inserted into the tubular lower end of the tongue 17 to be secured therein by the set screw 24. This counterbalance 20 is relatively thick and heavy, as shown, and it is disposed so that its width lies in a plane extending transversely of the truck.

The counterbalance 20 performs a double function. One of the functions of the counterbalance, aside from its function to normally tend to swing the tongue upwardly to vertical position, is to operate the hereinafter described wheel brake apparatus and its other function is to support friction brake shoes for frictional engagement with the floor or underlying surface over which the truck rolls. The friction shoes which are attached to the counterbalance are indicated generally by the numeral 25 and each comprises an elongated slightly arcuate lower or foot portion 26 which at one end is connected with the vertical shank portion 27 which is provided with a longitudinal slot 28 and which is disposed against the rear face of the supporting arm 21, to which it is secured by a screw 29 which passes through the slot 28. As shown in Fig. 7, each of the arms of the counterbalance carries one of the friction brake elements 25, and it will be seen upon reference to Fig. 3, that when the tongue 17 is disposed vertically, it may then be shifted longitudinally to bring the shoes 26 into contact with the underlying surface for braking or stopping the movement of the truck. When in this vertical position, the tongue may be secured by frictional engagement between the pair of spring fingers 30 which is secured to the front edge of the body 1. As previously stated, the forked or U-shaped counterbalance 20 also functions to operate a wheel engaging brake, which brake structure is as follows. Each of the front wheels 9 has disposed against the inner side thereof, a brake drum 31. This drum may be formed integrally with the wheel or if the brake structure is applied to a truck which is already in use, then the drum may be provided with a flange portion 32 which is positioned against the inner side of the wheel in encircling relation with the axial center thereof, and an annular plate 33 is then disposed upon the outer side of the wheel, and the flange and plate are connected together by bolts 34. Suitable additional holes to those provided for the bolts 34, may be provided as indicated at 35, where cast metal wheels are encountered, which have openings therethrough instead of wheels of the spoked variety, so that connecting bolts may be passed through the apertures 35 of the flanges and the outside plates to secure the brake drum in position.

Extending along the rear side of the axle is a tubular bar 36 and this is maintained in position by the relatively long bolts 37 which extend longitudinally of the truck through the axle body 4 upon opposite sides of the pivot pin 8, as shown in Fig. 3. Forwardly of the axle 4, these bolts pass through and are connected together by a pull bar 38 while at their rear ends, they pass through the tubular bar 36 and are maintained in operative connection therewith by wing nuts 39 which are threaded on the bolts and bear against the rear side of the bar 36.

Encircling each of the bolts 37 between the axle 4 and the bar 36, is a coiled spring 40 which constantly urges the bar 36 rearwardly from the axle.

At each end of the bar 36 is a brake shoe 41 for coaction with the adjacent drum 31 and the face of this shoe carries a liner 42 which engages the drum. Integral with each shoe is an arm 43 which extends laterally inwardly and is slidably engaged in the adjacent end of the tubular bar 36 where it is secured in set position by the set screw 44. By this arrangement the brake shoes are adjustable so that they may be made to accurately fit the truck structure for engagement with the brake drums.

Secured to the transverse center of the forward bar 38 is a forwardly extending rod 45. Upon its forward end this rod has threaded a thumb nut and washer unit 46, and encircling the forward major portion of the rod 45, is a sleeve 47. Interposed between the sleeve 47 and the bar 38 is a spring 48 which keeps the sleeve 47 and the bar 38 in spaced relation.

Connected to the under side of the arm 11 is a hanger 49 through the lower end of which the tubular sleeve 47 passes. This hanger assists in maintaining the sleeve 47 and the rod 45 in horizontal position. There is also secured to the under side of the arm 11 a spring bumper 50 against which the counterbalance 20 bears when the tongue is lowered for pulling the truck.

In the use of the wheel brakes, it will be seen that it is necessary to swing the tongue 17 to upright or vertical position at the same time lowering it, if necessary, through the guide 14 so that the spaced arms 21 of the counterbalance will pass upon opposite sides of the sleeve 47 and the counterbalance will be brought to bear against the washer nut 46, so that a forward pull will be applied to the rod 45 and to the rods or bolts 37, which are connected therewith through the medium of the cross-coupling bar 38. This will pull the brake shoes forwardly into contact with the adjacent drums 31. At the same time longitudinal downward force may be applied, if desired, to the tongue so as to press the friction shoes 26 on the underlying surface, thereby obtaining further braking action for effecting the stopping of the truck.

It will, of course, be recognized that while both the wheel brake and the ground engaging friction brake means may be used together upon the one truck, they may also be used separately, if desired. By removing the screws 29, the friction shoes may be removed so that only the wheel brakes will be operated when the counterbalance is pressed against the washer nut 46. On the other hand, if the wheel brakes should not be desired or if they should become badly worn so that they might have to be removed for repairs or replacement, then the ground engaging friction shoes might be used by themselves in the manner described for controlling the forward movement of the truck.

When using the ground engaging friction shoes 25 either alone or in conjunction with the wheel brakes, if the securing screws 19 are loosened then of course the tongue will be shifted forwardly until the screw 24, or any other suitable means which may be applied to the tongue, is brought into contact with the lower edge of the sleeve 14. However it will be obvious upon the examination of Fig. 3 of the drawings that the ground engaging friction shoes may also be used when the tongue is securely held in the sleeve 14 by the screws 19 since, because of the arcuate character of the foot of the friction shoes 25, they will frictionally engage the ground to have a braking action upon the movement of the truck, when the tongue is secured in the vertical position in which it is shown in Fig. 3.

From the foregoing, it will be readily apparent that there has been provided in the structure illustrated and described, a very efficient means for controlling trucks of the character stated, and it will also be apparent that the wheel brake mechanism may be readily applied to trucks already in use and not having any braking means, or such mechanism may be initially incorporated in the truck structure when the same is manufactured, in which case, of course, the coacting bolt secured flanges and plates 32 and 33, respectively, would not be necessary as the brake drum would be cast or made integral with the wheel. Also, it will be apparent that the friction brake means might also be applied to a truck structure without employing the wheel brakes so that trucks which are already in use and do not have any braking means, might be easily equipped with this form of brake.

What is claimed is:

1. In a wheeled truck structure having a pair of steerable wheels, an arm connected with said pair of wheels and extending forwardly therefrom, a sleeve pivotally supported by the arm for oscillation on an axis extending transversely of the truck, a tongue extending through and adjustable lengthwise in said sleeve, a wheel brake for said pair of wheels, a ground engaging friction brake operatively connected with the tongue, and means for coupling the tongue with the wheel brake upon oscillation of the tongue in one direction, the said oscillation of the tongue facilitating bringing the frictional brake in engagement with the underlying truck supporting surface.

2. A truck structure having a pair of steerable wheels, a brake drum carried by each of said wheels, a pair of brake shoes supported for movement relative to said drums, resilient means normally urging movement of the shoes away from the drums, a supporting structure carried by the steerable wheels, a tongue, pivot means coupling the tongue with the supporting structure for oscillation on a pivot extending transversely of the truck, means carried by the tongue for establishing connection between the same and the brake shoes to effect movement of the shoes into contact with the drums when the tongue is swung to upright position, said means comprising a forwardly extending longitudinally shiftable rod having direct connection with said brake shoes and a bifurcated body connected with and forming a longitudinal extension of the end of the tongue nearest said pair of wheels, and an element carried upon the forward end of said rod against which said bifurcated body bears upon the swinging of the tongue vertically and the straddling of the rod by the bifurcated body.

3. A truck structure having a pair of steerable wheels, a brake drum carried by each of said wheels, a pair of brake shoes supported for movement relative to said drums, resilient means normally urging movement of the shoes away from the drums, a supporting structure carried by the steerable wheels, a tongue, pivot means coupling the tongue with the supporting structure for oscillation on a pivot extending transversely of the truck, means carried by the tongue for establishing connection between the same and the brake shoes to effect movement of the shoes into contact with the drums when the tongue is swung to upright position, said tongue being supported for longitudinal movement in addition to its pivotal movement on the support, and a friction shoe coupled with the tongue for frictional engagement with the underlying truck supporting surface upon downward longitudinal movement of the tongue after the same has been disposed in upright position.

4. In a truck of the character stated having a pair of steerable wheels, a brake drum disposed concentrically of and against the inner side of each wheel, each of said drums having a laterally extending encircling flange, a plate disposed against the outer side of each wheel, coupling means extending through and connecting said plates together to grip the interposed portion of the wheel therebetween, a pair of brake shoes each disposed adjacent a drum, means supporting said shoes for movement relative to the drums, resilient means constantly urging movement of the shoes away from the drums, a draft tongue, means pivotally coupling the tongue with the truck for oscillation on an axis extending transversely of the truck, a pull rod operatively coupled with said brake shoes, and means for establishing connection between said tongue upon movement of the latter to a vertical position and said pull rod for effecting movement of the brake shoes by the tongue into contact with said drums.

5. In a truck of the character stated having a pair of steerable wheels, a brake drum disposed concentrically of and against the inner side of each wheel, each of said drums having a laterally extending encircling flange, a plate disposed against the outer side of each wheel, coupling means extending through and connecting said plates together to grip the interposed portion of the wheel therebetween, a pair of brake shoes each disposed adjacent a drum, means supporting said shoes for movement relative to the drums, resilient means constantly urging movement of the shoes away from the drums, a draft tongue, means pivotally coupling the tongue with the truck for oscillation on an axis extending transversely of the truck, a pull rod operatively coupled with said brake shoes, a stop means carried by said pull rod, and a counterbalance body secured to said draft tongue at the pivoted end thereof, said counterbalance body functioning to urge the swinging of the tongue to upright position and further being bifurcated to straddle said pull rod for engagement with said stop whereby upon movement of the tongue to vertical position a pull may be applied to the pull rod to effect the movement of the brake shoes into contact with the drum.

6. In a truck of the character stated having a pair of steerable wheels, an arm connected with said pair of wheels and extending forwardly therefrom, a sleeve pivotally supported by said arm for oscillation on an axis extending transversely of the truck, a tongue slidably supported in said sleeve, means for adjustably securing the tongue in the sleeve, a relatively heavy counterbalance body connected with the tongue below the pivoted sleeve and normally tending to swing the tongue to vertical position, and a resilient ground engaging shoe carried by the counterbalance.

7. In a truck of the character stated having a pair of steerable wheels, a brake drum carried by each wheel, mechanism supported for horizontal reciprocal movement between the wheels and including a pair of brake shoes arranged to engage said drums, and a pull rod extending horizontally forwardly from the pair of wheels, an arm operatively connected with the pair of wheels and extending forwardly over said pull rod, a sleeve pivotally supported by the arm for oscillation on an axis extending transversely to the length thereof and transversely of the truck, a draft tongue extending through said sleeve and shiftable axially therethrough, means for adjustably securing the draft tongue in the sleeve, a relatively heavy bifurcated counterbalance connected with the tongue below the pivoted sleeve and adapted to straddle the pull rod upon movement of the tongue to a vertical position, means for establishing a connection between the counterbalance and the pull rod when the tongue is vertically disposed for effecting movement of the brake shoe mechanism in one direction for application of the shoes to the drums, and a pair of resilient friction shoes connected with the furcations of said counterbalance for engagement with the ground surface upon lengthwise shifting of the tongue downwardly through the sleeve.

8. In a truck of the character stated having a pair of steerable wheels, an arm connected with said pair of wheels and extending forwardly therefrom, a tongue operatively coupled with said arm to have longitudinal movement with respect thereto and to have oscillatory movement on an axis extending transversely of the truck, means for adjustably securing the tongue to the arm after longitudinally moving the tongue with respect to the arm, and a ground engaging braking means carried by the tongue below the point of connection between the same and the arm, to be engaged with the ground when the tongue is disposed in upright position.

9. A structure as set forth in claim 8, in which said ground engaging braking means comprises an arcuate resilient element having the arcuate side thereof disposed for contact with the ground.

M. G. PETERSEN.